United States Patent [19]

Elwell

[11] Patent Number: 5,293,097

[45] Date of Patent: Mar. 8, 1994

[54] FULLY AUTOMATIC ENERGY EFFICIENT LIGHTING CONTROL AND METHOD OF MAKING SAME

[75] Inventor: Brian E. Elwell, Brentwood, Calif.

[73] Assignee: Novitas, Inc., Culver City, Calif.

[21] Appl. No.: 799,490

[22] Filed: Nov. 27, 1991

Related U.S. Application Data

[63] Continuation-in-part of Ser. No. 619,794, Nov. 29, 1990, Pat. No. 5,142,199.

[51] Int. Cl.$^5$ .................. H05B 37/02; H05B 41/36
[52] U.S. Cl. .................................. 315/154; 315/159; 250/221; 250/214 AL; 307/116
[58] Field of Search ............... 315/154, 155, 149, 150, 315/159, 158, 307, 194, 291, 360, 361, 315, DIG. 4, 152, 153, 316, 312; 250/203.1, 216, 221, 353, 214 AL, 214 R; 362/125; 307/116, 117; 340/565, 567

[56] References Cited

U.S. PATENT DOCUMENTS

| | | | |
|---|---|---|---|
| 4,225,808 | 9/1980 | Saraceni | 315/307 |
| 4,233,545 | 11/1980 | Webster et al. | 250/214 AL |
| 4,751,399 | 6/1988 | Koehring et al. | 307/117 |
| 4,792,731 | 12/1988 | Pearlman et al. | 315/316 |
| 4,843,283 | 6/1989 | Chen | 315/153 |
| 4,873,469 | 10/1989 | Young et al. | 315/155 |

OTHER PUBLICATIONS

Unenco brochure: "Common Sense Energy Conservation" describing a device, the Conserver-U that purportedly was available in 1983.

*Primary Examiner*—Steven Mottola
*Assistant Examiner*—Ali Neyzari
*Attorney, Agent, or Firm*—Robbins, Berliner & Carson

[57] ABSTRACT

A fully automatic and energy efficient lighting control or light switch comprises different settings, preset by a user, and activates all or a portion of at least one bank of lights upon detecting occupants within a room. In one embodiment, the light switch detects doppler-shifted, reflected ultrasonic waves caused by occupant motion within the room. In an automatic mode, the light switch is configured to automatically switch from an initial sensitivity level for detecting motion within a short range therefrom, to a higher sensitivity level for detecting motion anywhere within the room. After the room is empty or no motion is sensed, the light switch is configured to turn the lights off following a variable time delay. The light switch returns to its initial low sensitivity level following a predetermined grace period which begins once the lights are turned off. The lights can be turned off manually when the light switch is in its automatic mode, in which case, the light switch continues to operate at the higher sensitivity level. When motion is no longer detected, and following the variable time delay and predetermined grace period, the switch automatically returns to an automatic "on" state. In an alternative manual mode, the light switch can be activated manually and deactivated both manually and automatically. In its manual mode, the light switch is configured to deactivate the lights upon sensing no motion and is configured to reactivate the lights automatically within the predetermined grace period upon sensing motion.

37 Claims, 6 Drawing Sheets

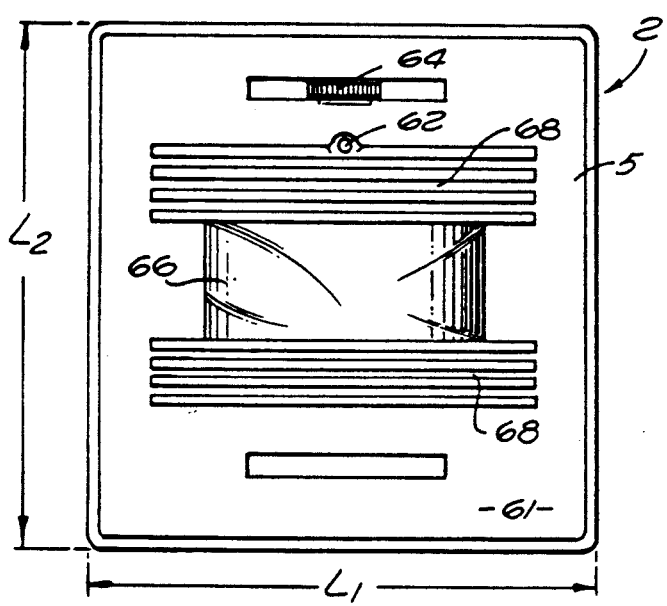
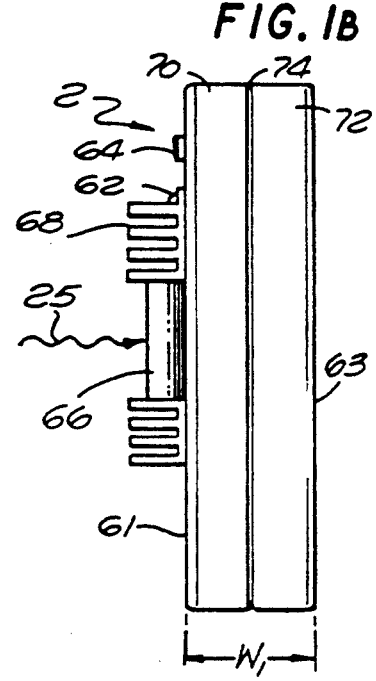
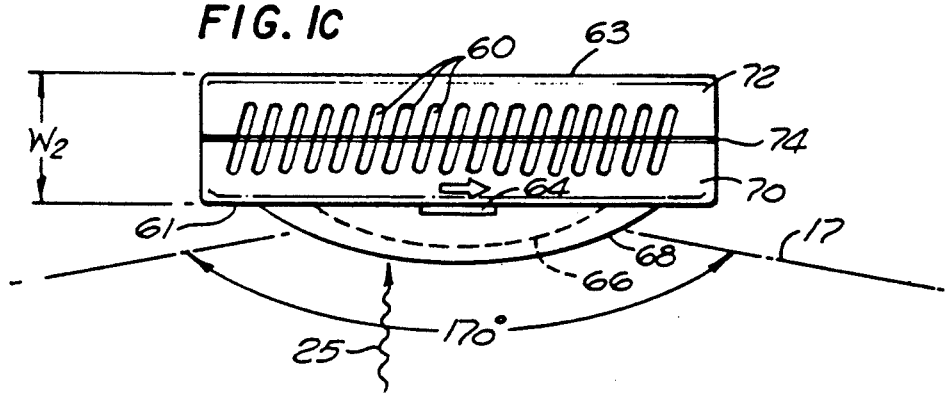
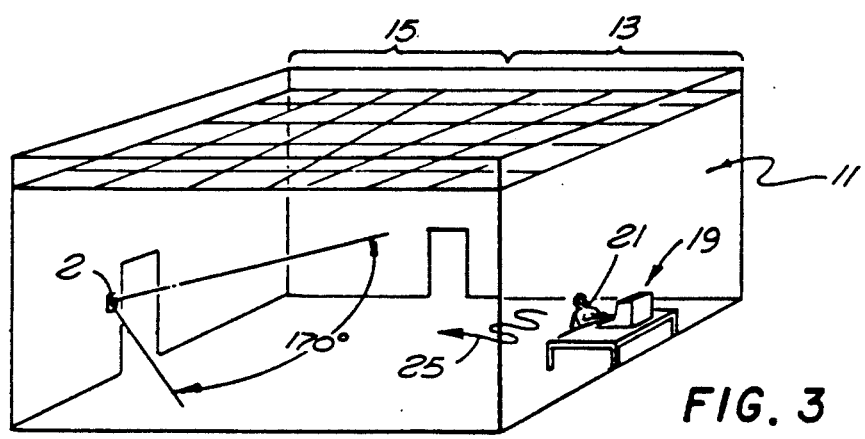

FULLY AUTOMATIC ENERGY EFFICIENT LIGHTING CONTROL AND METHOD OF MAKING SAME

REFERENCE TO CROSS RELATED APPLICATIONS

This application is a continuation-in-part of application Ser. No. 07/619,794 filed Nov. 29, 1990, now U.S. Pat. No. 5,142,199 and entitled "ENERGY EFFICIENT INFRARED LIGHT SWITCH AND METHOD OF MAKING SAME".

FIELD OF THE INVENTION

The present invention relates generally to lighting controls. More specifically, the present invention relates to a lighting control or light switch which is automatic and energy efficient and provides automatic control of at least one bank of lights within a room, for example by detecting doppler-shifted, ultrasonic waves reflected by persons entering into and moving within the room.

BACKGROUND OF THE INVENTION

Conservation of energy is a critical national and worldwide concern. Continuous lighting in empty rooms is an unnecessary waste of energy. Some state and local energy conservation/building codes require installation of two light switches in the construction or reconstruction of offices, each to control a different portion of the overhead lighting. The reasoning behind such requirements is that in the interest of energy conservation, employees and janitorial personnel may be offered the opportunity to use approximately one half of the light they would normally require in their day-to-day activities. Depending upon the amount of ambient light available, employees working in a room may select to use only one half of the available bank or banks of lights.

Further, employees may tailor their specific lighting needs to their activities and location in the room. For example, employees working in an area not receiving sufficient ambient light may require more artificial light, depending upon their specific activities. Similarly, employees located in an area receiving sufficient ambient light may require less artificial light. Utilizing office lighting effectively, such that only approximately fifty percent is sometimes used and only in occupied offices, results in substantial energy savings. In addition, for computer applications, it is advantageous to reduce the level of light to eliminate the glare on cathode ray tubes (CRT). Conventional manual switches are inefficient because they depend upon human judgment to turn all or only a portion of the lights on and off. Existing automatic wall switches have also proven to be inefficient. For example, currently available light switches or the like used in offices emit an ultrasonic wave into a room and detect motion of persons by sensing a doppler-shift in the reflected ultrasonic wave. The doppler-shift in the reflected wave is caused by persons moving within the room.

Typically, these ultrasonic light switches are preset to a sensitivity level such that a person moving anywhere within the room is detected. Because the preset sensitivity level for the reflected ultrasonic wave is fixed, a wall switch located adjacent an open door can detect persons moving outside the door and unnecessarily turn on the lights within the room.

Although a wall switch that turns lights on automatically is preferable in most instances, in some applications occupants prefer a manual option for activating lights. For example, in situations where a person enters the room for a very brief period of time, such as a secretary delivering papers, the lights do not need to be turned on. Another example is a situation in which there is adequate ambient light.

SUMMARY OF THE INVENTION

The present invention provides a light switch, preferably an ultrasonic light switch or the like for a lighting system which is automatic and energy efficient and alleviates the problems associated with prior light switches. The light switch comprises different settings which are preset by a user.

In one aspect of the invention, the light switch in an automatic mode is configured to automatically activate lights upon detecting motion of any type within a room. In accordance with this aspect, in an exemplary embodiment, the light switch is set to an initial sensitivity level so that only motion within a short range (also referred to as an initial detection range) from the light switch is detected. An ultrasonic transmitter transmits acoustic energy or an ultrasonic wave of predetermined frequency into the room and an ultrasonic receiver receives a doppler-shifted, ultrasonic reflected wave indicating motion within the room.

Once the light switch detects motion within the short range, it automatically adjusts to a higher sensitivity level so that it is able to detect motion anywhere within the room. After motion is no longer detected during a variable time delay, the light switch automatically turns the lights off and initiates a predetermined grace period during which the light switch maintains the higher sensitivity level and continues to detect motion anywhere within the room. If no motion is detected during the predetermined grace period, the light switch returns to its initial sensitivity, thereby reducing the detection range in order to detect only persons entering the room.

In the event the lights are turned off inadvertently, such as if a person remains motionless during the entire variable time delay period, the predetermined grace period advantageously allows an occupant to wave an arm or otherwise make simple motions anywhere within the room to turn the lights back on.

In another aspect of the invention, the lighting can be turned off manually while the light switch is in its automatic mode, in which case it remains at its high sensitivity level while there are occupants in the room. After no motion is detected during the variable time delay and the predetermined grace period, the automatic light switch resets to its "automatic on" state and returns to its initial sensitivity level.

In yet another aspect of the invention, in a manual mode, the light switch is activated manually. In its manual mode, the light switch is configured to keep the lights off until someone activates the light switch. The lights will automatically turn off upon not sensing motion during the entire variable time delay period. If the occupant makes a motion within the predetermined grace period, the lights will automatically turn back on. If no motion is sensed during the predetermined grace period, the wall switch must be manually reactivated.

In still another aspect of the invention, the light switch comprises a load control switch that causes the light switch to activate at least one bank of lights within a room. The light switch operates at various voltages including, but not limited to 120 and 277 volts.

In yet another aspect of the invention, the light switch comprises a three position bypass switch which is used in the rare event of product failure. The bypass switch has an "off" setting for deactivating the light switch and the lights, an "automatic" setting for normal use in which the lights are controlled by the light switch, and an "on" position for electrically bypassing the light switch and leaving the lights on.

BRIEF DESCRIPTION OF THE DRAWINGS

A complete understanding of the present invention and the above and other features of the invention may be gained from a consideration of the following description of the preferred embodiments taken in conjunction with the accompanying drawings in which like reference numerals indicate like parts, and in which:

FIG. 1A is a front plan view of the exterior of an energy efficient infrared light switch in accordance with one embodiment;

FIG. 1B is a side plan view of the energy efficient infrared light switch;

FIG. 1C is a top plan view of the exterior of the energy efficient infrared light switch;

FIG. 3 is a schematic representation of the energy efficient infrared light system incorporating the switch detecting a computer operator in a room and activating at least one bank of available lights.

DETAILED DESCRIPTION OF THE PREFERRED EMBODIMENTS

Figure 2:
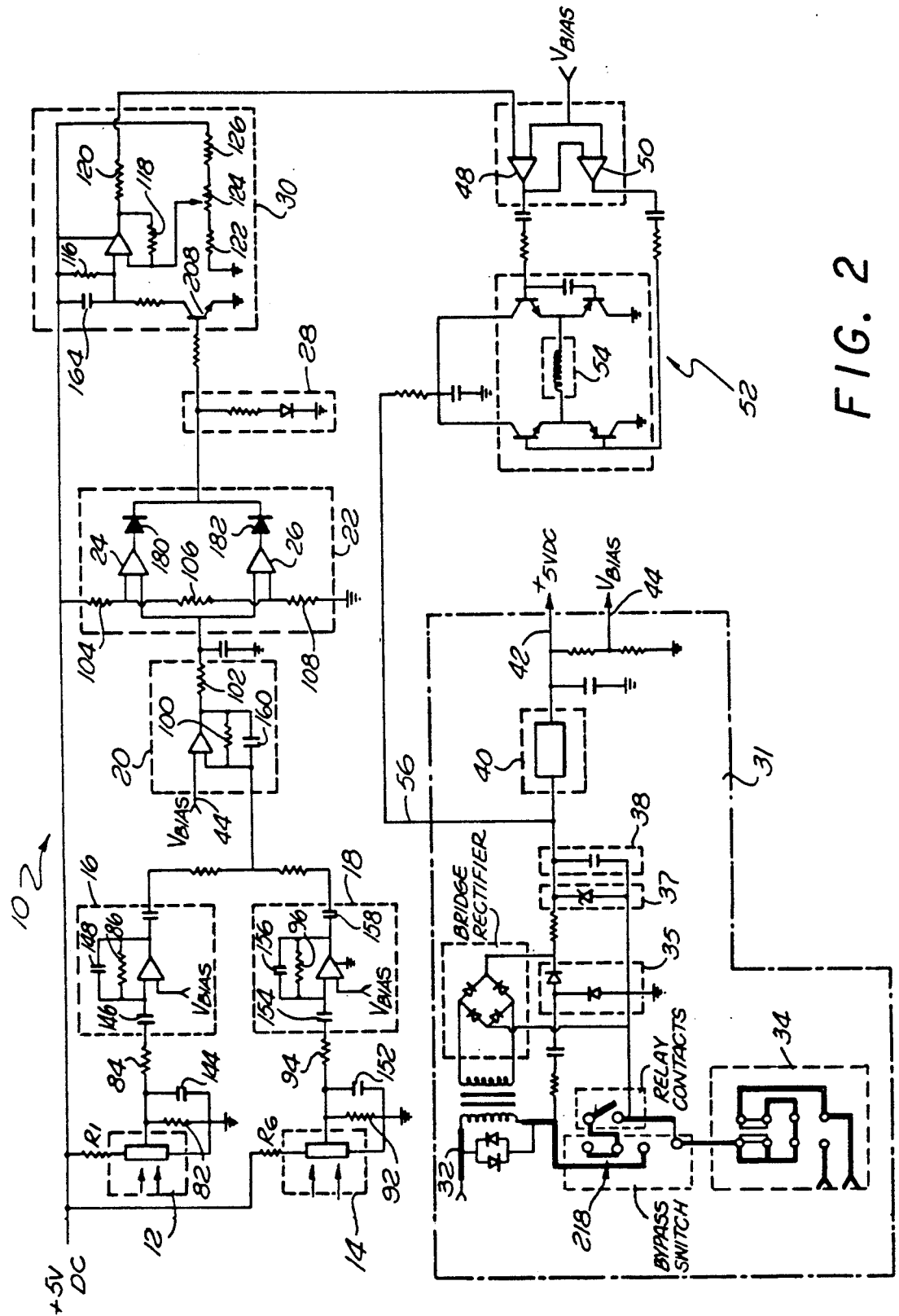
FIG. 2 is a schematic representation of the electric circuit for the energy efficient infrared light switch.

An energy efficient light switch, such as an infrared light switch in accordance with one embodiment, replaces an existing standard wall switch and consists of at least two infrared detectors which can provide the device with a sweep of 170° to 180° within a bounded area. The infrared light switch is preset by the user to selectively activate all, none or a portion of the lights activated by the switch using the three-position switch. Through the use of two passive infrared detectors, the energy received by those detectors is converted to signals which are then separately amplified, mixed and then jointly amplified. The mixed and amplified signal is sent to a window comparator which compares the amplified and mixed signals to two predetermined known voltage signals. If the received, amplified and mixed signal is greater than the high setpoint of the window comparator, or lower than the low setpoint of the window comparator, a signal indicator is initiated indicating motion detection. The dual power supply in conjunction with a push-pull circuit and latching relay, then selectively actuates all, none or a portion of the lamps available within the bounded area.

FIG. 1A is a front plan view of the exterior case 5 of the energy efficient infrared light switch 2. The exterior case 5 has a light emitting diode (LED) 62 as a signal detection indicator. A three-position switch 64, located upon the front of the exterior case 5, facilitates the individual setting of the light efficient switch 2 to selectively activate all, none or a portion of the lights. The infrared detectors 66, 66' can be seen beneath the surface of the casing 5 within a protective cover. A stylus groove 68 provides ornamental decoration, but more importantly, also facilitates the receipt of infrared energy from the bounded area under detection. The front surface 61 of the energy efficient infrared light switch 2 has a height indicated at L2 and a width indicated at L1. In one exemplary configuration the front surface 61 is square in configuration and L1 and L2 are 4.25 inches each.

FIG. 1B is a side plan view of the exterior of the energy efficient infrared light switch 2, where its front surface 61 is exposed to a room and its back surface 63 is fixably mounted to a wall or corner. An interfitting seal 74 joins the front faceplate portion 70 of the switch and its rear cover portion 72. The stylus groove 68 can be seen inscribed upon the surface of the faceplate portion 70 where the three-position switch 64 is located above the light emitting diode 62. As shown in FIG. 1B, infrared energy 25 strikes the surface of the infrared detector 66. The energy efficient infrared light switch 2 is shown in this example as being mounted to the surface of a wall interior to the bounded area.

As can be seen clearly in FIG. 1C, the faceplate 70 is interconnected with an interfitting seal 74 to a portion of the rear cover 72. The front surface 61 of the faceplate 70 faces the interior of a bounded area or room. The back surface 63 attaches or mounts to a wall or a corner within that bounded area. The field of view 17 or sweep range, in the illustrated embodiment using two detectors, is between 170° to 180°. Infrared energy is indicated at 25 as striking the detector 66. As shown above the stylus groove 68, this three position switch 64 is operable to allow the detector switch 2 to be set to activate all, none or one half of the lights.

Referring now to FIG. 2 the circuit 10 comprises a first infrared detector 12 and a second infrared detector 14 which are operable to provide a combined sweep range of 170° to 180°. This sweep range is sufficiently wide to facilitate detection within a bounded area. The front end or first amplifier 16 for the first detector 12 includes an operational amplifier which converts and amplifies the infrared energy 25 received by the first infrared detector 12. The front end or first amplifier 18 for the second infrared detector 14 is also an operational amplifier and receives radiated infrared converted energy detected by the second infrared detector 14. Resistors R1 and R6 both having a resistance value of 100 kΩ, are connected in series, respectively, with the first and second infrared detectors 12 and 14. The first and second detectors 12 and 14, respectively, are not active since they do not emit infrared energy which is then redetected upon its return to the system. Rather the detectors passively await the receipt of infrared energy 25 emitted from within the bounded area. The signals received by the passive detectors 12 and 14 are filtered through a resistant capacitance filter having a resistor 82 with a resistance value of 220 kΩ, a capacitor 144 having a capacitance value of, 0.022 µF and a third resistor 84 having a resistance value of 10 kΩ.

As shown in FIG. 2, the second infrared detector 14 also includes a second filtering system wherein a resistor 92 having a resistance value of 220 kΩ, a capacitor 152 having a capacitance value of 0.022 µF and a second resistor 94 having a resistance value of 10 kΩ, also serve to filter the received signal.

As shown in FIG. 2, the front end amplifier 16 for the first infrared detector 12 contains an operational amplifier and two capacitors 146 having a capacitance value of 10 µF, a capacitor 148 having a capacitance value of 0.01 µF and a resistor 86 having a resistance value of 2.7 MΩ. A parallel system, a front end amplifier 18 for the second infrared detector 14, also contains capacitors 154 having a capacitance value of 10 µF, a capacitor 156 having a capacitance value of 0.01 µF, a resistor 96 having a resistance value of 2.7 MΩ, and a third capacitor 158 having a capacitance value of 10 µF. Operational amplifiers in both front end amplifiers 16 and 18 receive a bias voltage 44 from the dual power system 31.

In FIG. 2, the signals that have been filtered and amplified individually, from the first and second infrared detectors 12 and 14, are combined prior to entering the second amplification stage 20. The signal enters a second operational amplifier and a resistive capacitance circuit, having a resistor 100 with a resistance value of 2.2 MΩ, a capacitor 160 having a capacitance value of 0.01 µF, and a second resistor 102 having a resistance value of 2.2 kΩ. Again, the operational amplifier of the second amplification stage 20 is driven by a voltage bias 44 which is received from the dual power supply 31.

The twice-amplified, mixed, combined and received signal from the first and second infrared detectors 12 and 14, respectively, finally enters a window comparator 22, containing first and second comparator circuits 24 and 26, respectively, which includes operational amplifiers and resistors 104, 106 and 108, which have resistance values of 22 kΩ, 10 kΩ and 15 kΩ, respectively. The comparator circuit also includes two diodes, 180 and 182 which are both 1N4148 diodes. The double amplified signal is compared in a comparator circuit 22 to the setpoint voltages established by the voltage divider network of resistors 104, 106 and 108. If the received, amplified signal is either greater than the high setpoint or lower than the low setpoint of the window comparator circuit 22, the indicator detector, such as a light emitting diode (LED) 28, is actuated to the "on" position demonstrating that infrared energy has been detected. The output signal from the comparator 22 after it illuminates the LED 28 when motion is detected, enters into a timing circuit 30 which includes a transistor 208, a resistor 114 which has a resistance value of 100 Ω, a capacitor 164 which has a capacitance value of 100 µF, a resistor 116 which has a resistance value of 6.8 MΩ, a resistor 120 which has a resistance value of 100 Ω, a resistor 118 which has a resistance value of 100 kΩ, and three resistors, 122, 124 and 126, having respective resistance values of 620 Ω, 10 kΩ and 3.9 kΩ. The timing circuit 30 provides a time delay for the detection of infrared energy variable between 30 seconds and 15 minutes, once the variable resistor 124 is set.

As shown in FIG. 2, the electrical circuit for the energy efficient switch includes a dual power supply circuit 31 which is activated by placing slide switch 218 into the center or automatic position. The power supply functions differently with the lights on than with the lights off. With the lights on, power is converted with the current transformer and full wave rectified with the bridge rectifier. When the lights are off, power is converted via a resistor and capacitor and then half wave rectified in the circuit 35. The voltage is then preregulated in the circuit 37 and filtered with capacitor 38. The voltage is then regulated with voltage regulator 40 which provides the circuitry with a maintained 5 VDC source and the bias voltage used by circuits 16, 18 and 20 and operational amplifiers 48 and 50.

Load control switch 34, which is a double pole, three position slide switch, is provided so that all, none or a portion of the lights are activated upon infrared energy detection. As shown in FIG. 2, power line 56, which contains the DC voltage signal after it has been rectified, preregulated, and filtered, leaves the dual power supply circuit and enables the latching relay control circuit 52 to activate the control of the lights.

Operational amplifiers 48, 50 function as comparators driven from the timing circuit 30, to provide a pulse to the latching relay through the latching relay control circuit 50. Once the time delay period is over, the operational amplifiers 48 and 50 will change to the opposite state and cycle the relay contacts open, thereby turning the lights off.

FIG. 3 is a schematic representation of an energy efficient light system detecting a person operating a computer in a bounded area or room containing two banks of lights. A standard room 11 has first and second banks of lights 13 and 15. In actual use, the lights are wired so that one half or approximately one half of the lights in each fixture are connected to each circuit and can be controlled independently. The switch 2 replaces the conventional single or dual toggle switch generally mounted into the wall proximate the door. A computer work station 19 is positioned within the field of view. The person 21 seated at the computer console emits infrared energy 25, which is detected within the sweep view of the detector 2. Upon infrared energy detection, the switch 2 either turns on the first bank of lights 13 or the second bank of lights 15 dependent upon the detection of the individual and the setting of the switch 2 to activate all, none or one half of the available lights. In the exemplary embodiment, the two detectors of the switch 2 provide a field of view of approximately 170°.

Figure 4:
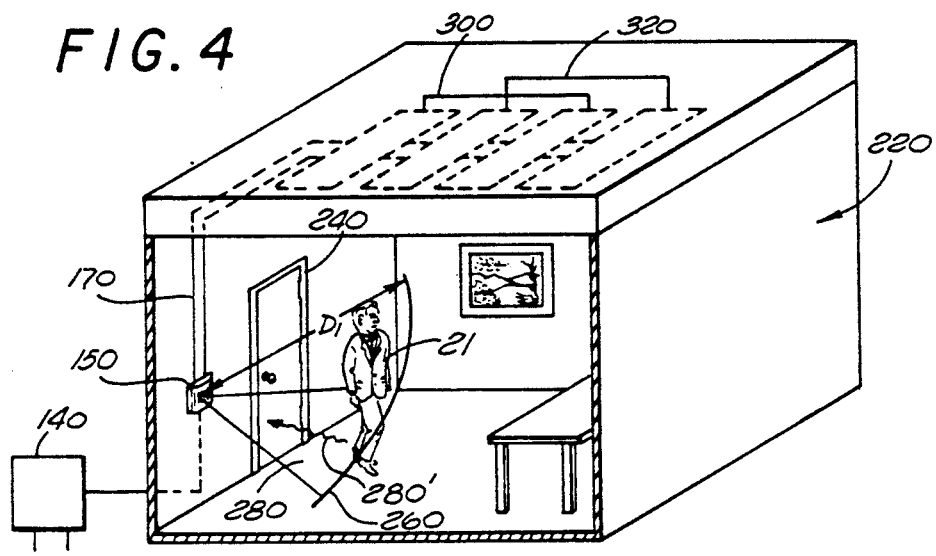
FIG. 4 is a schematic representation of an automatic and energy efficient lighting system or control in accordance with another embodiment of the present invention, showing a light switch, preset to an initial sensitivity level for detecting a person entering a room and activating all or a portion only of at least one bank of available lights.
Figure 5:
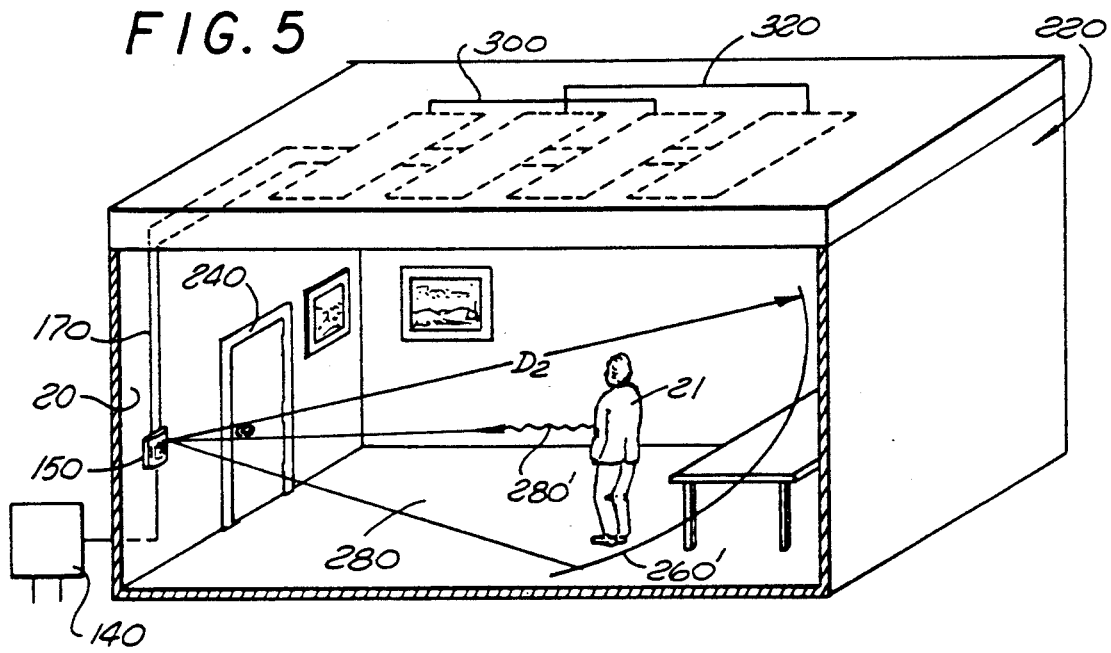
FIG. 5 is a schematic representation of the automatic and energy efficient light system shown in FIG. 4, illustrating the light switch preset to a higher sensitivity level for detecting a person moving anywhere within the room.

FIGS. 4 through 9B illustrate another embodiment of the present invention. FIGS. 4 and 5 illustrate generally a fully automatic and energy efficient lighting system comprising a light switch 150, for example ultrasonic or the like, in accordance with another embodiment of the present invention, mounted adjacent a door 240, of a room 220 or other such confined area. The embodiments illustrated herein merely exemplify the invention which may take forms different from the specific embodiments disclosed. The light switch 150 of the present invention replaces a standard wall mounted single or dual toggle switch.

In an automatic mode, the light switch 150 is preset by a user to an initial sensitivity level, at which it detects motion only within an initial limited range, indicated by curve 260, and distance from the door 240, indicated by $D_1$. The initial limited range 260 is sufficient to detect a person 21 entering the room 220, but not spurious movement outside the room 220, and to turn on at least one bank of available lights. For illustration purposes, only two alternating banks of lights, 300, 320 are shown. Each light bank consists of all lamps, which are connected to a single lighting power circuit. The lights 300, 320 may be of any type, for example fluorescent or incandescent.

When the light switch 150 detects a person 21 entering into the initial limited range 260, the light switch 150 is configured to automatically adjust to a higher sensitivity level, at which the light switch 150 detects motion within an expanded or extended range, beyond the initial limited range 260, indicated at 260'. The expanded range 260' preferably covers the entire room 220. This higher sensitivity level can be varied as desired and is preset by a user when the light switch 150 is installed. The light switch 150 keeps the lights 300, 320 on for as long as it senses motion within the room 220. When motion is no longer detected, such as when a person 21 leaves the room 220, the lights 300, 320 are automatically turned off after a variable time delay anywhere less than 60 minutes which can be varied and preset by a user. In the illustrated embodiment, the time delay is variable anywhere from 30 seconds to 15 minutes.

After the lights 300, 320 have been turned off, there is a predetermined grace period anywhere less than 12 seconds, preferably 5 seconds, during which the light switch 150 continues to detect motion within the expanded range. This is an advantageous safety feature in instances where the lights 300, 320 turn off inadvertently because the person was not moving sufficiently to be detected during the variable time delay. During the predetermined grace period, a person can wave an arm or otherwise cause motion to be detected, anywhere within the room 220 to reactivate the lights 300, 320. After the predetermined grace period, the light switch 150 resets to its initial low sensitivity level. The light switch 150 can be turned off manually in its automatic mode, in which case it automatically resets to its initial low sensitivity level following the variable time delay and the predetermined grace period if no motion is sensed during that time.

In an alternative manual mode, the light switch 150 can also be operated manually to turn the lights 300, 320 on and off. In its manual mode, when no motion is sensed, the light switch turns off the lights 300, 320 automatically and is configured to reactivate the lights automatically within the predetermined grace period only upon sensing motion. This is a safety feature because it saves a person from walking to and groping in the dark for the light switch 150 to reactivate the lights 300, 320 manually.

Referring now to FIG. 4, in the automatic mode the light switch 150, preset to the limited detection range 260, detects an individual entering the room 220 and activates at least one bank of lights from the two available banks 300, 320, depending upon which one is connected thereto. The light switch 150 is connected between a power source 140 and the banks of lights 300, 320 by electrical lines 170. The light switch 150 emits ultrasonic acoustic energy 28 into the room 220 at a predetermined frequency, preferably 25,000 Hz (Hertz). At the initial sensitivity level it only receives doppler-shifted reflected waves 280' when a person 21 is within the initial detection range 260 or distance $D_1$ from the door 240, preferably between one and five feet.

Referring now to FIG. 5, the light switch 150 is configured to automatically adjust its sensitivity level, once a person 21 moving within the limited detection range 260 is detected and all or a portion only of the lights 300, 320 are turned on. This second sensitivity level allows the light switch 150 to detect motion within an extended detection range, indicated by curve 260', at locations within the room 220 which are remote from the light switch 150 and beyond the initial detection range 260 in order to keep the lights 300, 320 on. At the higher sensitivity level, the light switch 150 receives doppler-shifted reflected ultrasonic waves 280' when a person 21 is within the expanded detection range 260' or within a distance $D_2$ from the door 240. In an exemplary embodiment, distance $D_2$ is preferably between five and twenty-five feet. Depending upon the size of the room 220, the higher sensitivity level can be varied to detect persons at any distance. The detected motion may be as little as motion caused by a person writing or turning his or her head.

The light switch 150 is preset to keep the lights 300, 320 on as long as a doppler-shift is detected in the reflected ultrasonic waves 280'. The lights 300, 320 turn off when a person 21 leaves the room 220 and no more motion is detected during the variable time delay, preferably anywhere from 30 seconds to 15 minutes. The variable time delay is preset when the ultrasonic switch 150 is installed and may be varied by a user as desired. After the lights 300, 320 have been turned off, the light switch 150 continues to detect motion within the expanded range during the predetermined grace period. This is an advantageous safety feature in instances where the lights 300, 320 are turned off inadvertently because the person within the room 220 is not moving sufficiently to be detected during the variable time delay. During the predetermined grace period, a person can wave an arm or otherwise cause motion to be detected, anywhere within the room 220 to reactivate the lights 300, 320. After the predetermined grace period, the light switch 150 resets to its initial low sensitivity level.

Figure 6:
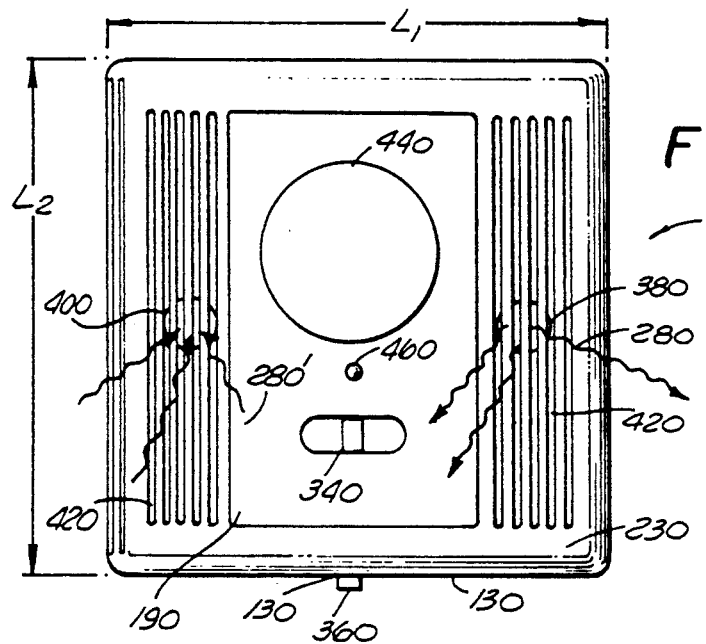
FIG. 6 is a front plan view of an exterior housing or front case of the light switch shown in FIG. 4.

Referring now to FIG. 6, a touch sensitive control cover 440 can be manually operated by users to turn the lights 300, 320 (shown in FIGS. 1 and 2) on or off, when illumination is not desired or necessary. The touch sensitive control cover 440, disposed on an exterior housing or front case 230 of the light switch 150, is fabricated preferably from a medium impact plastic.

In the event the lights 300, 320, are intentionally or manually turned off, while the light switch is in its automatic mode, for example, if a user wants to darken the room to view slides or for any other reason, the light switch remains at its higher sensitivity level in order to detect motion anywhere within the room while occupants are present. The light switch resets to "automatic on" returning to its initial sensitivity level after no motion is detected during the variable time delay and predetermined grace period.

In an alternative manual mode, the light switch 150 can also be operated manually to turn the lights 300, 320 on and off. In its manual mode, when no motion is sensed, the light switch turns off the lights automatically and is configured to reactivate the lights automatically within the predetermined grace period only. This is a safety feature because it saves a person from having to walk to the light switch 150 in the dark to reactivate the lights 300, 320. After the predetermined grace period has lapsed which begins when the lights 300, 320 have been turned off, the light switch 150 resets to its initial low sensitivity level.

The light switch 150 has three settings which can be preselected by a user. First, a push button touch sensitive switch 1240 (shown in FIG. 9A) disposed under the control cover 440 can be manually operated. The lights 300, 320 are turned on and off by depressing the control cover 440 to contact the touch sensitive switch 1240. Second, a dual position, load control switch 350 (shown in FIG. 8) is mounted under a load control switch cover 340. The load control switch 350 is displaced between a left position and a right position, by a user, to preselect whether all or only a portion of the lights 300, 320 connected to the light switch 150 are activated. Third, an automatic or manual two position mode switch 1580 sets the light switch 150 in its "automatic" or "manual" mode.

Figure 8:
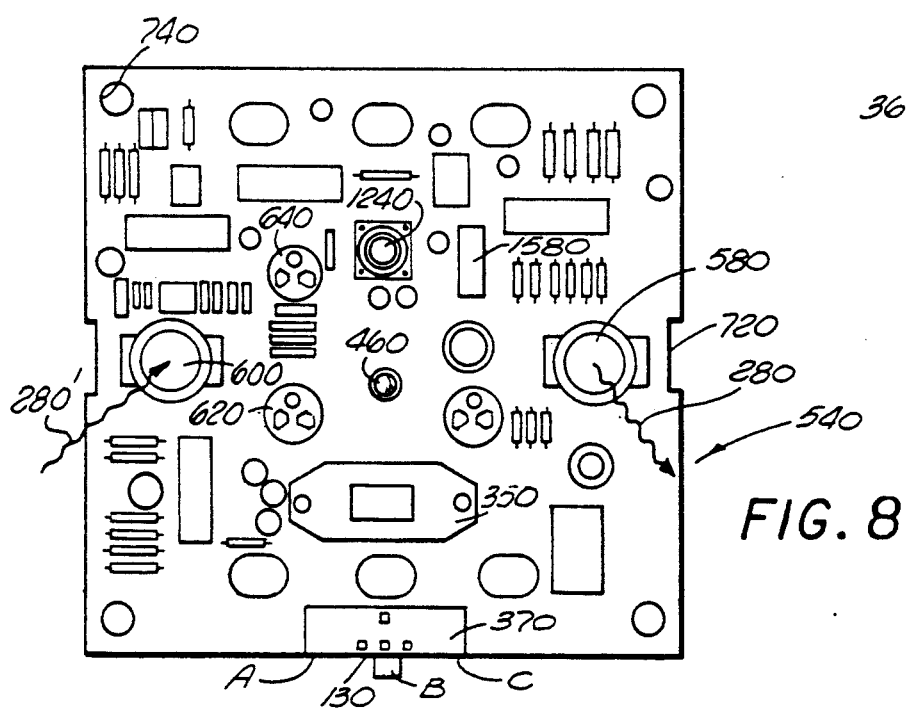
FIG. 8 is a front plan view of a circuit board of the light switch of the present invention.

Referring also to FIG. 8, a three position bypass switch 370 is located on a circuit board 540 housed within the exterior housing 230. An actuator 360 of the bypass switch 370 protrudes beyond a peripheral edge 130 to facilitate manual positioning. A user can move the actuator 360 to an extreme left position, indicated at A, to turn off or deactivate the ultrasonic switch 150, a center position, indicated at B, to set the switch 150 in its automatic mode, or an extreme right position, indicated at C, to bypass the ultrasonic switch 150 and turn on the lights in case of failure or for any other reason such as those discussed above.

As shown in FIG. 6, the exterior housing 230, upon its front face 190, has a motion detection indicator 460, preferably a LED (light emitting diode), which lights up upon detecting motion. The motion detector indicator 460 is located on the exterior housing 230 between the touch sensitive control cover 440 and the two position load control switch 340. The exterior housing 230 includes at least one transmitter vent 380, preferably a plurality as shown in FIG. 6, through which ultrasonic waves 280 are emitted into the room 220. The exterior housing 230 has at least one receiver vent 400, preferably a plurality, through which the light switch 150 receives doppler-shifted reflected waves 280' from the room 220.

A stylus groove 420 over both transmitter and receiver vents 380, 400, respectively, provides ornamental decoration to the exterior housing 230 but, more importantly, allows the ultrasonic waves 280 to be emitted and received within the room 220. The stylus grooves 420 are inscribed upon the front surface 190 of the exterior housing 230, adjacent touch sensitive switch control cover 440. The exterior housing 230 of the light switch 150 has a suitable length, indicated at $L_1$ and a suitable width, indicated at $L_2$. In an exemplary embodiment, the exterior housing 230 has a square configuration wherein $L_1$ and $L_2$ have equal dimensions, preferably approximately 4.25 inches.

Figure 7:
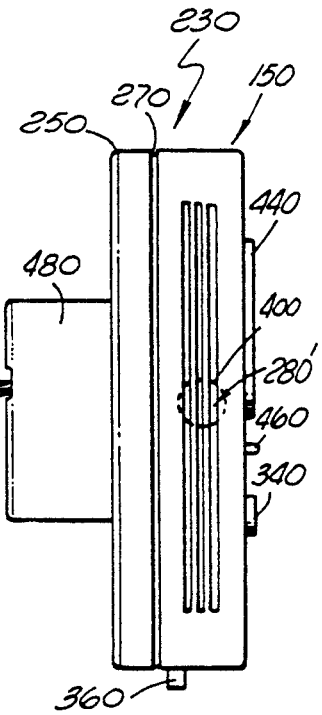
FIG. 7 is a side plan view of the exterior housing of the light switch shown in FIG. 6.

Referring now to FIG. 7, the front surface 190 of the exterior housing 230 faces the room 220 and a back surface 250 is mounted to a wall. An interfitting seal 270 joins the front surface 190 and the back surface 250 of the exterior housing 230. A cavity 480 accommodates a power supply board (not shown) and extends from the back surface 250 of exterior housing 230. Power input supply wires 500 enter the cavity 480 and electrically connect the light switch 150 to the power supply 140 (shown in FIGS. 4 and 5) and the lights 300, 320. The light switch 150 in the illustrated embodiment is operated at a supply voltage of preferably 120 volts or 277 volts.

Referring again to FIG. 8, an ultrasonic transmitter 580 and an ultrasonic receiver 600 are positioned upon opposing sides of the circuit board 540. The ultrasonic transmitter 580 emits ultrasonic waves 280, preferably at a frequency of 25,000 Hz, through the transmitter vent 380 (shown in FIG. 6) into the room 220. The ultrasonic receiver 600 receives reflected waves 280' from the room 220. Movement is detected by detecting a doppler-shift in the reflected ultrasonic waves 280' caused by persons moving within the room 220. The initial sensitivity level 260 of the light switch 150 is preset by an entry sensitivity control 620 so that the light switch 150 initially detects movement only within a limited detection range 260. As described above, the limited detection range 260 is between one to five feet so that the light switch 150 advantageously detects a person entering the room 220 without causing the light switch 150 to activate unnecessarily as a result of spurious motion occurring beyond that range.

An area sensitivity control 640 sets the higher detection sensitivity level and is preset to cause the light switch 150 to detect motion within the expanded detection range 260' at a distance of preferably five feet and beyond within the room 220. Area sensitivity control 640 enables the light switch 150 to detect motion within the room after a person 21 has traversed beyond the initial detection range 260. Motion detection indicator 460 lights up when the lights 300, 320 are turned on, indicating that motion is detected.

In operation, the three position bypass switch 370 can be preset by a user in three distinct positions: "bypass off" position A, "bypass automatic" position B and "bypass on" position C, to determine if and how the lighting within the room 220 is activated. When the bypass switch 370 is in the "bypass off" position A, the light switch 150 does not turn on the lights 300, 320 automatically. When the bypass switch 370 is in the "automatic" position B, the lights 300, 320 connected to the switch 150 turn on automatically upon detecting motion within the initial detection range and turn off automatically upon sensing no motion during the variable time delay. When the switch 150 is in the "bypass on" position, the lights are turned on regardless of whether or not motion is detected.

The touch sensitive switch control cover 440 can be activated by a touch to turn the connected banks of lights 300, 320 on or off. The load control switch 350 which is a two position switch, can be preset by a user to manually or automatically activate, all or a portion of the banks of lights 300, 320 electrically connected to the light switch 150. The load control switch 350 is set in a left position to turn a portion of the banks of lights 300, 320 on during automatic or manual activation. Likewise, it is set in a right position to turn on all of the banks of lights 300, 320 connected to the light switch 150.

Figure 9A:
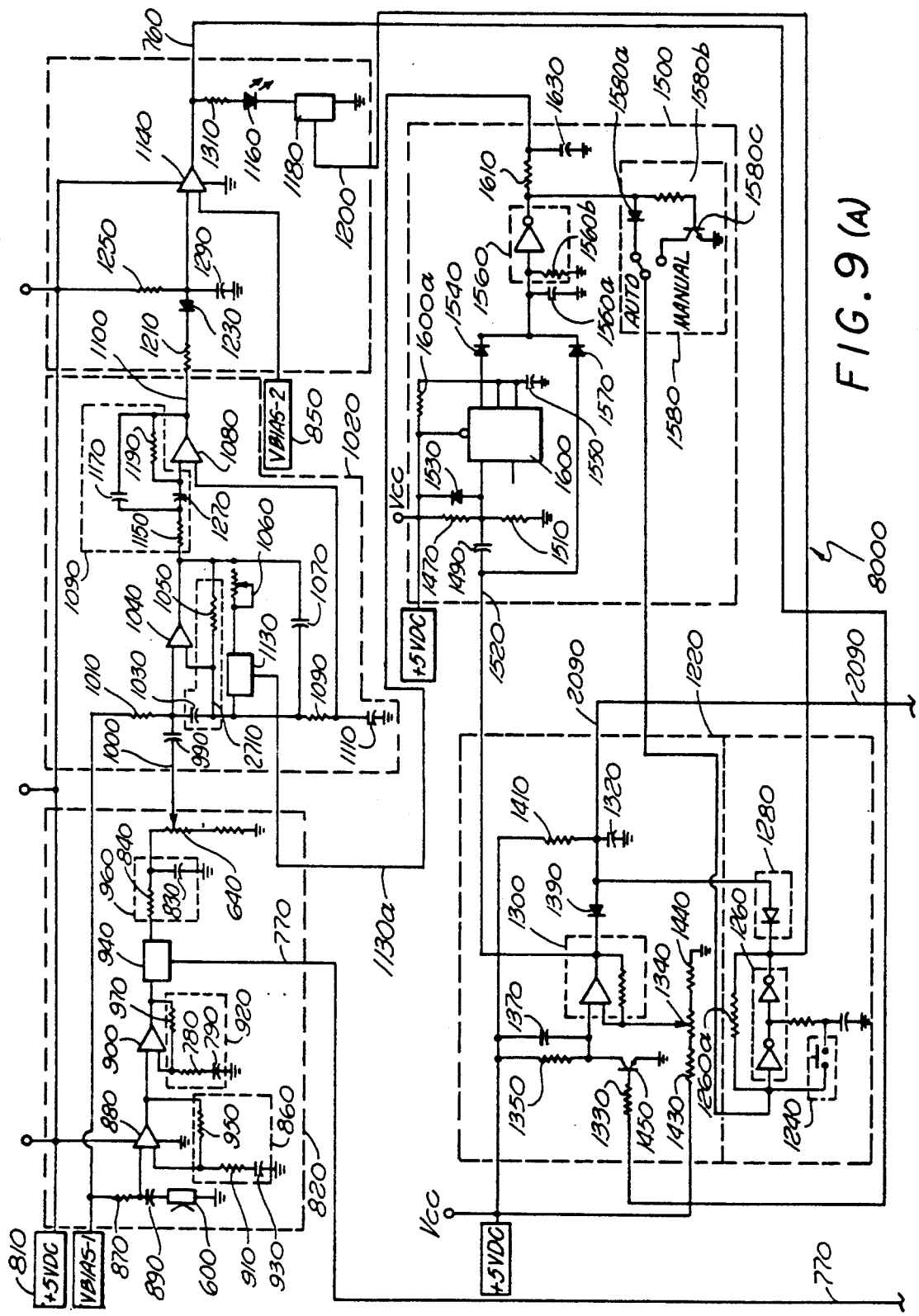
FIG. 9A is a schematic representation of a portion of an electric circuit for the light switch of the present invention.

Referring now to FIG. 9A, a circuit 8000 of the light switch 150 comprises a preamplification circuit 820 having the ultrasonic receiver 600 which receives the doppler-shifted reflected ultrasonic waves 280' caused by a person 21 moving within the room 220. These doppler-shifted reflected ultrasonic waves 280' are amplified and filtered before they are compared to the ultrasonic sound waves 280 emitted by the light switch 150. A pull-up resistor 870, having an exemplary resistance value of 33 kΩ, provides the bias voltage for the preamplifier stages. The receiver 600 is connected in series with a capacitor 890, having an exemplary capacitance value of 0.01 µF, and is connected to the input of an amplifier 880.

The amplifier 880 and an amplifier 900 amplify the reflected ultrasonic waves 280' received by the receiver 600. A feedback network 860 comprising a resistor 910, a resistor 950 and a capacitor 930, having exemplary resistance and capacitance values of 1 kΩ, 33 kΩ and 0.01 µF, respectively, support the amplifier 880. A feedback network 920 including a resistor 780, a resistor 970 and a capacitor 790, having exemplary resistance and capacitance values of 33 kΩ, 200 kΩ and 0.01 µF, respectively, support the amplifier 900.

An analog switch 940, controlled by an input 770, controls whether the amplified, received signals are connected to the remainder of the circuit 800. The output of the analog switch 940 is connected to a low pass filter 960 including a resistor 840, having an exemplary resistance value of 10 kΩ, and a capacitor 830, having an exemplary capacitance value of 0.01 µF. The output of the low pass filter 960 is connected to the area sensitivity control 640, preferably a variable resistor having an exemplary resistance value of anywhere between 10 kΩ and 500 kΩ.

In operation, the area sensitivity control 640 is set such that as its variable contact is set toward ground, no signal is output from the preamplifier circuit 820. If the variable contact is set high, away from ground, a high preamplifier output 1000 connects to a bandpass circuit 1020. The area sensitivity control 640 is set to cause the circuit 8000 to detect motion occurring within the entire room 220. The bandpass circuit 1020 receives the preamplifier output 1000 from the area sensitivity control 640, amplifies and filters the same, passing only the doppler-shift frequency characteristics of the reflected ultrasonic waves 280'.

A pull-up resistor 1010, having an exemplary resistance value of 33 kΩ, provides the bias voltage for the bandpass circuit 1020. A capacitor 990, having an exemplary capacitance value of 2.2 µF, passes the preamplifier output 1000 into an amplifier 1040 of the bandpass circuit 1020. The amplifier 1040 and an amplifier 1020 amplify the preamplifier output 1000. Amplifier 1040 has a feedback network 2710 comprising a resistor 1050 and a capacitor 1030, having exemplary resistance and capacitance values of 510 kΩ and 0.01 µF, respectively. Amplifier 1080 has a feedback network 1090 consisting of a resistor 1150, having an exemplary resistance value of 6.2 kΩ, a capacitor 1170, having an exemplary capacitance of 0.0068 µF, a capacitor 1270, having an exemplary capacitance value of 0.1 µF and a resistor 1190, having an exemplary resistance value of 3.3 MΩ. A resistor 1090, and capacitors 1070 and 1110 of the bandpass circuit 1020 have exemplary resistance and capacitance values of 10 kΩ, 0.001 µF and 0.1 µF, respectively.

The entry sensitivity control 620 comprises a variable resistor 1060 having an exemplary resistance value of 50 kΩ. The variable resistor 1060 is used to preset the initial sensitivity level representative of the limited detection range 260, for example, one to five feet within the room 220. An analog switch 1130 connects the variable resistor 1060 in parallel with the feedback resistor 1050 when input 1130a is logically high. A bandpass output 1100 carries the filtered, demodulated and amplified wave to a comparator circuit 1120.

The comparator circuit 1120 compares the bandpass output signal 1100 to a predetermined second bias voltage 850 (VBIAS-2). The response time of the comparator circuit 1120 is preset by a resistor 1210, a diode 1230, a resistor 1250, and a capacitor 1290. The diode 1230 is preferably a 1N4148 diode, the resistor 1250 has an exemplary resistance value of 1 MΩ, the capacitor 1290 has an exemplary capacitance value of 2.2 µF. A resistor 1310 has an exemplary resistance value of 330 Ω. When the comparator output signal 1100 is high, indicating no detection of motion, an output 760 of a comparator 1140 is low. When the bandpass output signal 1100 is sufficiently low to discharge the capacitor 1290 to a value lower than the predetermined second bias voltage 850, indicating detection of motion, the output 760 of the comparator 1140 is high, thereby resetting a timer circuit 1220. The comparator output 760 is connected to an analog switch 1180 via a resistor 1310, having an exemplary resistance value of 330 Ω, and an LED 1160 of any conventional type known to those skilled in the art. The analog switch 1180 has an input 1200 which is connected to the output of the toggle circuit 1260. The LED 1160 serves as the motion detection indicator 460.

The comparator output 760 from the comparator circuit 1120 is connected to the timer circuit 1220. Comparator output 760 is connected via a resistor 1330, having an exemplary resistance value of 2.2 kΩ. When motion is detected, a transistor 1450, having an exemplary part number of 2N3904, turns on, which in turn charges a capacitor 1370, which has an exemplary capacitance of 100 µF.

If motion is not detected, the transistor 1450 turns off and capacitor 1370, having an exemplary capacitance of 100 µF discharges its stored electrical charge through a resistor 1350, having an exemplary resistance of 6.8 MΩ. When the voltage is higher than the voltage set by a voltage divider comprised of a resistor 1430, a variable resistor 1340 and a resistor 1440, having exemplary resistance values of 6.8 kΩ, 10 kΩ, 510 Ω, respectively, an amplifier 1300 resets the grace timer circuit 1500. The variable resistor 1340 adjusts the variable time delay between approximately 30 seconds and 15 minutes. The amplifier 1300 includes a hysteresis resistor having an exemplary resistance value of 100 kΩ. After the variable time delay period has elapsed with no motion being detected, the output of amplifier 1300 goes low, causing the grace timer circuit 1500 to reset, and discharges capacitor 1320.

The timer circuit 1220 includes the push button touch sensitive switch 1240 in parallel with an inverter stage 1260 having two digital inverters. A resistor 1260a, having an exemplary value of 10 kΩ, is connected between the input and the output of the inverter stage 1260. If the output of the second inverter in series with a diode 1280, having an exemplary part number of 1N4148, is low, a capacitor 1320, having an exemplary capacitance value of 2.2 µF, is discharged through the diode 1280.

The circuit 8000 activates the lights 300, 320 when both the output of the amplifier 1300 and the output of the inverter stage 1260 are high. If either output is low, the capacitor 1320 discharges and does not enable the lights 300, 320 to be turned on. The output of the amplifier 1300 is connected via a diode 1390, having an exemplary part number 1N4148, to the capacitor 1320, the diode 1280 and a resistor 1410, having an exemplary resistance value of 10 kΩ.

A grace reset signal 1520 from the timer circuit 1220 is input to a grace timer circuit 1500. The grace timer circuit 1500 includes a timing chip 1600, preferably a 555 timer, which receives the grace reset signal 1520, via a capacitor 1490, having an exemplary capacitance value of 2.2 μF. The grace timer circuit 1500 maintains the sensitivity of the light switch 1500 to detect motion anywhere in the room for the predetermined grace period, which is approximately 5 seconds in this embodiment. A resistor 1470, having an exemplary resistance value of 100 kΩ, is connected between the supply voltage and the capacitor 1490. A resistor 1510, having an exemplary resistance value of 510 kΩ, is connected between the capacitor 1490 and ground. A diode 1530, having an exemplary part number 1N4148, is connected in parallel with the resistor 1470. A resistor 1600a, having an exemplary resistance value of 3.9 MΩ, is connected between the supply voltage and an input of the timing chip 1600. A capacitor 1550, having an exemplary capacitance value of 2.2 μF, is connected between the resistor 1600a and ground.

An output of the timing chip 1600 is connected to a diode 1540, having an exemplary part number 1N4148. The grace reset signal 1520 is connected to a diode 1570, having an exemplary part number 1N4148. The outputs of the diode 1540 and the diode 1570 are connected together and are connected to the input of an inverter 1560. A capacitor 1560a, having an exemplary capacitance value of 2.2 μF, and a resistor 1560b, having an exemplary resistance value of 220 kΩ, are connected in parallel between the input of the inverter 1560 and ground. The output of the inverter 1560 is connected via a resistor 1610, having an exemplary resistance value of 33 kΩ, to the input 1130a of the analog switch 1130. A capacitor 1630, having an exemplary capacitance value of 22 μF, is connected between the resistor 1610 and ground.

The output of the inverter 1560 is connected to the automatic or manual two position mode switch 1580 for setting the light switch 150 in its "automatic" or "manual" mode. An exemplary part number 1N4148, is connected between the output of the inverter 1560 and the "automatic" switch terminal. A resistor 1580b, having an exemplary resistance value of 2.2 kΩ is connected between the output of the inverter 1560 and the base of a transistor 1580c, having an exemplary part number 2N3904. The collector of the transistor 1580c is connected to the "manual" switch terminal. The center terminal of the mode switch 1580 is connected to the input of the inverter stage 1260.

In the "automatic" mode, while either of the outputs from the amplifier 1300 or the grace timer circuit remain high, the output of inverter 1560 is low. When the outputs of the amplifier 1300 and the grace timer circuit are both low, the output of the inverter 1560 goes high, causing the analog switch 1130 to turn on, resetting the switch 150 to the initial sensitivity setting. Also, when the inverter 1560 output goes high, the output of toggle circuit 1260 is forced high regardless of its present state. When in the "manual" mode, a high output from inverter 1560 turns on transistor 1580c via resistor 1580b thereby forcing the output of the toggle circuit 1260 to go low regardless of its present state.

Figure 9B:
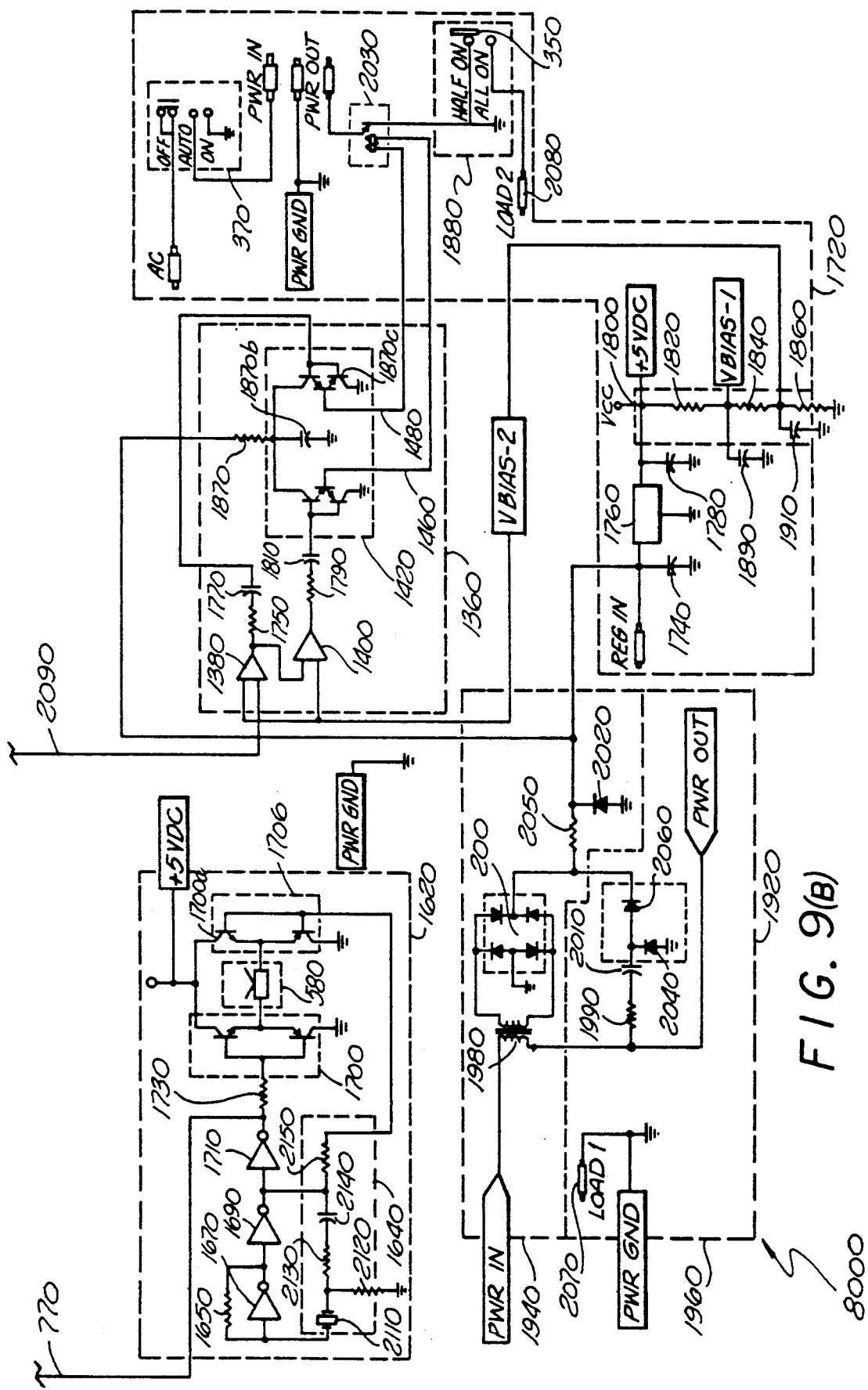
FIG. 9B is a schematic representation of the remaining portion of the electric circuit for the light switch of the present invention.

Referring now to FIG. 9B, a relay control circuit 1360 controls two comparators 1380 and 1400 and push-pull circuits 1420 which turn the banks of lights 300, 320 on and off. A signal 2090 from the timer circuit 1220 is connected to an input of the comparator 1380. The comparators 1380 and 1400 feed respective push-pull circuits 1420 through a resistor 1750, a capacitor 1770, a resistor 1790, and a capacitor 1810, respectively. Resistors 1750 and 1790 each have an exemplary resistance value of 1 kΩ, while capacitors 1770 and 1810 each have an exemplary capacitance value of 10 μF. Push-pull circuits 1420 include a resistor 1870 having an exemplary resistance value of 47 kΩ, a capacitor 1870b having an exemplary capacitance value of 220 μF and four transistors 1870c. In an exemplary embodiment, two of the four transistors are preferably part number 2N3904 and the other two are part number 2N3906. The output signals of the push-pull circuits 1420, a relay open signal 1460 and a relay closed signal 1480, activate a relay 2030 in a main power supply circuit 1720.

A transmitter circuit 1620 utilizes a crystal controlled circuit 1640 to generate the ultrasonic waves 280 of preferably 25,000 Hz. The crystal controlled circuit 1640 includes a crystal 2110, a capacitor 2140 and resistors 2120, 2130 and 2150. Capacitor 2140 has an exemplary capacitance value of 22 pF, while resistors 2120, 2130 and 2150 have exemplary resistance values of 1 MΩ, 1 MΩ and 2.2 kΩ, respectively. The 25,000 Hz signal is emitted through the ultrasonic transmitter 580. Push-pull circuits 1700, 1700' each contain two transistors 1700a which drive the ultrasonic transmitter 580. One transistor has a part number 2N3904 and the other has a part number 2N3906. Inverters 1670, 1690 and 1710 each have exemplary part number 4069. Resistors 1650 and 1730 have exemplary resistance values of 3.3 MΩ and 2.2 kΩ.

The main power supply circuit 1720 incorporates a voltage divider chain 1800. The voltage divider chain 1800 divides the main voltage for the circuit, which is preferably 5 volts DC, into the two biasing voltages, VBIAS-1 and VBIAS-2. A voltage regulator 1760 is connected to filter capacitors 1740 and 1780, each having exemplary capacitance values of 100 μF. The voltage regulator 1760 regulates the input voltage through voltage divider chain 1800, which contains resistors 1820, 1840 and 1860. Resistors 1820, 1840 and 1860 have exemplary resistance values of 10 kΩ, 3.3 kΩ and 10 kΩ, respectively. Capacitors 1890 and 1910 each have an exemplary capacitance value of 10 μF.

The main power supply circuit 1720 also includes the relay 2030, driven by the push-pull circuit 1420, which physically activates the lights 300, 320 on and off. LOAD2, indicated at 2080, represents a lighting load connected to the circuit 8000. LOAD2 is connected to the energy efficient load control switch 350. A user presets the two position load control switch 350 to activate a portion, for example, half or all of the lighting loads connected to the light switch 150. A first lighting load, LOAD1, indicated at 2070 is shown in the power supply board circuit 1920. The three position bypass switch 370 is also preset by a user to set the light switch 150 in its automatic mode or to bypass the light switch 150 completely.

The power supply board circuit 1920 can be mounted to a separate circuit board within the ultrasonic switch 150. The power supply board circuit 1920 contains two distinct power supply portions. Specifically, when the lights within the room have been activated, a first portion 1940 of the power supply board circuit 1920 provides power to the circuit 800. The first portion incorporates step-up transformer 1980, and a full wave rectifier 2000 comprising diodes each having exemplary part number 1N4005. Zener diode 2020, having exemplary part number 1N4747, receives the rectified voltage from resistor 2050, having an exemplary value of 100 Ω. The zener diode 2020 removes excess voltage from the rectified voltage output of rectifier 2000. When the lights are not turned on, the power is generated through a second portion 1960 of the power supply board circuit 1920, where the input voltage passes through resistor 1990, having a value of 27 Ω at 2 watts, and capacitor 2010 having a capacitance value of 0.47 μF rated at 630 V. Half-wave rectification occurs when the voltage passes through diodes 2040 and 2060, each having exemplary part number 1N4005. The zener diode 2020 again removes excess voltage from the voltage output of the half-wave rectifier.

While particular embodiments of the invention have been shown and described, it will be obvious to those skilled in the art that changes and modifications can be made without departing from the invention in its broader aspects and therefore the appended claims are intended to cover all such changes and modifications as allowed in the true spirit and scope of the invention.

What is claimed:

1. An energy efficient lighting control, comprising:
   preselection means having at least three selectable settings, a first setting for activating all of at least two banks of lights within a bounded area, said banks of lights electrically connected thereto, a second setting for activating a portion only of said banks of lights and a third setting for not activating any of said banks of lights, said preselection means being changeably preset to selectively activate all, none or a portion only of said banks of lights; and
   means for detecting an occupant within said bounded area, said detecting means coupled to said preselection means and said banks of lights and adapted to activate all, none or a portion of said banks of lights upon detecting an occupant within said bounded area, depending upon if said preselection means is preset to said first, said second or said third setting.

2. An energy efficient lighting control as defined in claim 1, further comprising:
   means for manually activating said lights, said manually activating means being electrically connected to said lights.

3. An energy efficient lighting control as defined in claim 2, wherein said manually activating means comprises a touch sensitive switch.

4. An energy efficient lighting control as defined in claim 1, further comprising:
   means for automatically turning off said lights following a variable time delay if said detecting means does not detect occupants during said variable time delay.

5. An energy efficient lighting control as defined in claim 4, wherein said variable time delay is less than 60 minutes.

6. An energy efficient lighting control as defined in claim 1, wherein said detecting means is adapted to automatically switch from an initial sensitivity level for detecting an occupant within an initial range to a higher sensitivity level for detecting an occupant within an expanded range.

7. An energy efficient lighting control, comprising:
   preselection means having three settings, a first setting for activating all of at least two banks of lights within a bounded area, said banks of lights electrically connected thereto, a second setting for activating a portion only of said banks of lights and a third setting for not activating any of said banks of lights, said preselection means preset to selectively activate all, none or a portion only of said banks of lights; and
   means for detecting occupants within said bounded area, said detecting means being adapted to switch from an initial sensitivity level for detecting occupants within an initial range to a higher sensitivity level for detecting occupants within an expanded range, said detecting means coupled to said preselection means and said banks of lights and adapted to activate all, none or a portion of said banks of lights upon detecting occupants within said bounded area, depending upon if said preselection means is preset to said first, said second or said third setting; and
   means for automatically resetting said detecting means to said initial sensitivity level from said higher sensitivity level following a predetermined grace period after said lights are turned off, said detecting means continuing to detect motion within said expanded range during said predetermined grace period.

8. An energy efficient lighting control as defined in claim 7, wherein said detecting means automatically turn on said lights upon detecting motion during said predetermined grace period if said lights are inadvertently turned off.

9. An energy efficient lighting control as defined in claim 8, wherein said predetermined grace period is less than 12 seconds.

10. An energy efficient lighting control as defined in claim 1, further comprising:
    means for selecting between an automatic mode wherein said lights are automatically activated and a manual mode for allowing manual activation of said lights; and
    means for turning said lights off.

11. An energy efficient lighting control, comprising:
    preselection means having three settings, a first setting for activating all of at least two banks of lights within a bounded area, said banks of lights electrically connected thereto, a second setting for activating a portion only of said banks of lights and a third setting for not activating any of said banks of lights, said preselection means preset to selectively activate all, none or a portion only of said banks of lights;
    means for detecting occupants within said bounded area, detecting means coupled to said preselection means and said banks of lights and adapted to activate all, none or a portion of said banks of lights upon detecting occupants within said bounded area, depending upon if said preselection means is preset to said first, said second or said third setting;
    means for selecting between an automatic mode wherein said lights are automatically activated and a manual mode for allowing manual activation of said lights;
    means for turning said lights off;
    means effective in said automatic mode for turing off said lights manually, said detecting means maintaining said higher sensitivity level upon detecting motion, and resetting to said initial sensitivity level after no motion is detected during a variable time delay, after which said lights are automatically turned off;

means for defining a predetermined grace period immediately following said variable time delay during which said detecting means continues to detect motion within said expanded range; and means for resetting said detecting means to an automatic on state wherein said detecting means automatically turns on said lights upon detecting motion within said initial detecting range.

12. An energy efficient lighting control, comprising:

preselection means having three settings, a first setting for activating all of at least two banks of lights within a bounded area, said banks of lights electrically connected thereto, a second setting for activating a portion only of said banks of lights and a third setting for not activating any of said banks of lights, said preselection means preset to selectively activate all, none or a portion only of said banks of lights;

means for detecting occupants within said bounded area, detecting means coupled to said preselection means and said banks of lights and adapted to activate all, none or a portion of said banks of lights upon detecting occupants within said bounded area, depending upon if said preselection means is preset to said first, said second or said third setting;

means for selecting between an automatic mode wherein said lights are automatically activated and a manual mode for allowing manual activation of said lights;

means for turning said lights off;

means effective in said manual mode for turing off said lights automatically, after no motion is detected during a variable time delay after which said lights are automatically turned off;

means for defining a predetermined grace period immediately following said variable time delay during which said detecting means detects motion within said expanded range; and means for resetting said detecting means to a manual on state requiring manual activation of said lights.

13. An energy efficient lighting control as defined in claim 1, further comprising:

means for selectively activating all of said lights.

14. An energy efficient lighting control as defined in claim 1, further comprising:

means for selectively activating substantially half of said lights.

15. An energy efficient lighting control as defined in claim 1, further comprising:

a three position bypass switch having an off setting for deactivating said lighting control, an automatic setting for normal use and an on setting for electrically bypassing said lighting control and leaving said lights on.

16. An energy efficient lighting control as defined in claim 1, wherein said lighting control replaces a wall mounted single or dual toggle switch.

17. An energy efficient light switch, comprising:

means for detecting motion within an initial range, said detecting means preset to an initial sensitivity level;

means for automatically switching said detecting means to a preset higher sensitivity level from said initial sensitivity level upon detecting motion within said initial range, said detecting means detecting motion at said higher sensitivity level within an expanded range; and means for automatically activating at least one bank of lights upon detecting motion within either said initial range or said expanded range.

18. An energy efficient light switch as defined in claim 17, further comprising:

means for manually activating said lights, said manually activating means being electrically connected to said lights.

19. An energy efficient light switch as defined in claim 17, further comprising:

means for receiving a reflected ultrasonic wave from the room, said activating means activating said lights when said reflected ultrasonic wave is a doppler-shift of said ultrasonic wave emitted into the room.

20. An energy efficient light switch as defined in claim 19, further comprising means for resetting said detecting means to said initial sensitivity level when said reflected ultrasonic wave is not the doppler-shift of said ultrasonic wave emitted into the room.

21. An energy efficient light switch as defined in claim 17, further comprising:

means for automatically turning off said lights following a variable time delay if said detecting means does not detect any motion during said variable time delay.

22. An energy efficient light switch as defined in claim 21, wherein said variable time delay is in a range between 30 seconds to 15 minutes.

23. An energy efficient light switch as defined in claim 17, further comprising:

means for automatically resetting said detecting means to said initial sensitivity level from said higher sensitivity level following a predetermined grace period after said lights are turned off, said detecting means continuing to detect motion within said expanded range during said predetermined grace period.

24. An energy efficient light switch, comprising:

means for emitting an ultrasonic wave at a predetermined frequency into a room;

means for detecting motion within an initial range, said detecting means preset to an initial sensitivity level;

means for switching said detecting means to a preset higher sensitivity level from said initial sensitivity level upon detecting motion within said initial range, said detecting means detecting motion at said higher sensitivity level within an expanded range;

means for automatically activity at least one bank of lights upon detecting motion within either said initial range or said expanded range; and means for automatically resetting said detecting means to said initial sensitivity level from said higher sensitivity level following a predetermined grace period after said lights are turned off, said detecting means continuing to detect motion within said expanded range during said predetermined grace period;

wherein said detecting means automatically turns on said lights upon detecting motion during said predetermined grace period if said lights are inadvertently turned off.

25. An energy efficient light switch as defined in claim 23, wherein said predetermined grace period is 5 seconds.

26. An energy efficient light switch as defined in claim 17, further comprising:
means for selecting between an automatic mode wherein said lights are automatically activated and a manual mode for allowing manual activation of said lights; and
means for turning said lights off.

27. An energy efficient light switch, comprising:
means for emitting an ultrasonic wave at a predetermined frequency into a room;
means for detecting motion within an initial range, said detecting means preset to an initial sensitivity level;
means for switching said detecting means to a preset higher sensitivity level from said initial sensitivity level upon detecting motion within said initial range, said detecting means detecting motion at said higher sensitivity level within an expanded range;
means for automatically activating at least one bank of lights upon detecting motion within either said initial range or said expanded range;
means for selecting between an automatic mode wherein said lights are automatically activated and a manual mode for allowing manual activation of said lights;
means for turning said lights off;
means effective in said automatic mode for turning off said lights manually, said detecting means maintaining said higher sensitivity level upon detecting motion after no motion is detected during a variable time delay after which said lights are automatically turned off;
means for defining a predetermined grace period immediately following said variable time delay during which said detecting means continues to detect motion within said expanded range; and
means for resetting said detecting means to an automatic on state wherein said detecting means automatically turns on said lights upon detecting motion within said initial detection range.

28. An energy efficient lighting control, comprising:
means for emitting an ultrasonic wave at a predetermined frequency into a room;
means for detecting motion within an initial range, said detecting means preset to an initial sensitivity level;
means for switching said detecting means to a preset higher sensitivity level from said initial sensitivity level upon detecting motion within said initial range, said detecting means detecting motion at said higher sensitivity level within an expanded range;
means for automatically activating at least one bank of lights upon detecting motion within either said initial range or said expanded range;
means for selecting between an automatic mode wherein said lights are automatically activated and a manual mode for allowing manual activation of said lights;
means for turning said lights off;
means effective in said manual mode for turning off said lights automatically, after no motion is detected during a variable time delay after which said lights are automatically turned off;
means for defining a predetermined grace period immediately following said variable time delay during which said detecting means detects motion within said expanded range; and
means for resetting said detecting means to a manual on state requiring manual activation of said lights after automatically turning off said lights.

29. An energy efficient light switch as defined in claim 17, further comprising:
a three position bypass switch having an off setting for deactivating said light switch, an automatic setting for normal use and an on setting for electrically bypassing light switch and leaving said lights on.

30. A method for automatically activating at least a portion of the lighting within a room, comprising the steps of:
presetting a preselection means in one of three settings, a first setting for activating all of at least two banks of lights within said room, a second setting for activating a portion only of said banks of lights and a third setting for not activating any of said banks of lights;
detecting motion within an initial range by a detector preset to an initial sensitivity level;
automatically switching said detector to a preset higher sensitivity level from said initial sensitivity level upon detecting motion within said initial range, said detector detecting motion within an expanded range at said higher sensitivity level; and
automatically activating all, none or a portion of said lights upon detecting motion within said initial range and said expanded range.

31. A method for automatically activating at least a portion of the lighting within a room as defined in claim 30, further comprising the step of:
manually activating said lights.

32. A method for automatically activating at least a portion of the lighting within a room as defined in claim 30, further comprising the step of:
automatically turning off said lights following a variable time delay if said detector does not sense any motion during said variable time delay.

33. A method for automatically activating on and off at least a portion of the lighting within a room as defined in claim 30, further comprising the step of:
automatically resetting said detector to said initial sensitivity level from said higher sensitivity level following a predetermined grace period after said lights are turned off, said predetermined grace period allowing said detector to continue detecting motion within said expanded range.

34. A method for automatically activating at least a portion of the lighting within a room as defined in claim 30, further comprising the step of:
selecting between an automatic mode wherein said lights are automatically turned on and a manual mode for allowing manual activation of said lights.

35. A method for automatically activating at least a portion of the lighting within a room, comprising the steps of:
presetting a preselection means in one of three settings, a first setting for activating all of at least two banks of lights within said room, a second setting for activating a portion only of said banks of lights and a third setting for not activating any of said banks of lights;

detecting motion within an initial range by a detector preset to an initial sensitivity level;

automatically switching said detector to a preset higher sensitivity level from said initial sensitivity level upon detecting motion within said initial range, said detector detecting motion within an expanded range at said higher sensitivity level;

automatically activating all, none or a portion of said lights upon detecting motion within said initial range and said expanded range;

turning off said lights manually in said automatic mode, said detecting means maintaining said higher sensitivity level upon detecting motion after no motion is detected during a variable time delay, after which said lights are automatically turned off;

defining a predetermined grace period immediately following said variable time delay during which said detecting means continues to detect motion within said expanded range; and resetting said detecting means to an automatic on state wherein said detecting means automatically turns on said lights upon detecting motion within said initial detection range.

36. A method for automatically activating at least a portion of the lighting within a room, comprising the steps of:

presetting a preselection means in one of three settings, a first setting for activating all of at least two banks of lights within said room, a second setting for activating a portion only of said banks of lights and a third setting for not activating any of said banks of lights;

detecting motion within an initial range by a detector preset to an initial sensitivity level;

automatically switching said detector to a preset higher sensitivity level from said initial sensitivity level upon detecting motion within said initial range, said detector detecting motion within an expanded range at said higher sensitivity level;

automatically activating all, none or a portion of said lights upon detecting motion within said initial range and said expanded range;

turning off said lights automatically in said manual mode after no motion is detected during a variable time delay, after which said lights are automatically turned off;

defining a predetermined grace period immediately following said variable time delay, during which said detecting means detects motion within said expanded range; and resetting said detecting means to a manual on state requiring manual activation of said lights after automatically turning off said lights.

37. An automatic lighting device, comprising:

means for detecting an occupant within a bounded area, said detecting means being adapted to switch from an initial sensitivity level for detecting an occupant within an initial range to a higher sensitively level for detecting an occupant within an expanded range; and means for automatically resetting said detecting means to said initial sensitivity level from said high sensitivity level following a predetermined grace period after said lights are turned off, said detecting means continuing to detect motion within said expanded range during said predetermined grace period.

* * * * *